United States Patent
Aposhian et al.

(10) Patent No.: US 9,894,824 B2
(45) Date of Patent: Feb. 20, 2018

(54) SOD HARVESTER HAVING PRELIMINARY STACKING HEAD

(71) Applicant: FireFly Automatix, Inc., North Salt Lake, UT (US)

(72) Inventors: Steven R. Aposhian, Farmington, UT (US); Eric E. Aston, Farmington, UT (US); William M. Decker, Salt Lake City, UT (US); Samuel H. Drake, Cottonwood Heights, UT (US); Daniel A. Aposhian, West Valley City, UT (US); Matthew G. Aposhian, Kaysville, UT (US)

(73) Assignee: FireFly Automatix, Inc., North Salt Lake, UT (US)

( * ) Notice: Subject to any disclaimer, the term of this patent is extended or adjusted under 35 U.S.C. 154(b) by 249 days.

(21) Appl. No.: 14/815,511

(22) Filed: Jul. 31, 2015

(65) Prior Publication Data

US 2017/0027099 A1 Feb. 2, 2017

(51) Int. Cl.
*A01B 45/04* (2006.01)

(52) U.S. Cl.
CPC .................. *A01B 45/045* (2013.01)

(58) Field of Classification Search
CPC ..................................................... B65G 47/086
See application file for complete search history.

(56) References Cited

U.S. PATENT DOCUMENTS

| | | | | |
|---|---|---|---|---|
| 3,877,584 A * | 4/1975 | Holcombe | ............ | A01B 45/045 172/19 |
| 3,887,013 A * | 6/1975 | Heiberg | ............... | A01B 45/045 172/20 |
| 4,294,316 A * | 10/1981 | Hedley | ................ | A01B 45/045 172/20 |
| 4,537,208 A * | 8/1985 | Kuhl | ...................... | B65G 60/00 134/124 |
| 7,641,437 B1* | 1/2010 | Tvetene | ............... | A01B 45/045 172/20 |
| 2005/0000705 A1* | 1/2005 | Brouwer | .............. | A01B 45/045 172/19 |
| 2005/0274530 A1* | 12/2005 | Brouwer | .............. | A01B 45/045 172/19 |
| 2013/0259629 A1* | 10/2013 | Aposhian | ............. | A01B 45/045 414/788.1 |
| 2015/0359160 A1* | 12/2015 | Aposhian | ............. | A01B 45/045 414/791.6 |
| 2017/0027100 A1* | 2/2017 | Aposhian | ............. | A01B 45/045 |

* cited by examiner

*Primary Examiner* — Robert E Pezzuto
(74) *Attorney, Agent, or Firm* — Kirton McConkie; Brian Tucker

(57) ABSTRACT

A sod harvester can include a preliminary stacking head for stacking slabs of sod prior to the stacked slabs being removed from a stacking conveyor for stacking on a pallet. In this way, the stacking head can remove multiple layers of sod during a single stacking operation. The preliminary stacking head can be positioned overtop a conveyor and can be configured to pick up a slab of sod as the slab travels along the conveyor. The preliminary stacking head can then drop the slab on top of a trailing slab thereby forming a stack of slabs on the conveyor. The conveyor over which the preliminary stacking head is positioned can be an inclined conveyor that transports slabs of sod from the ground to a stacking conveyor.

20 Claims, 12 Drawing Sheets

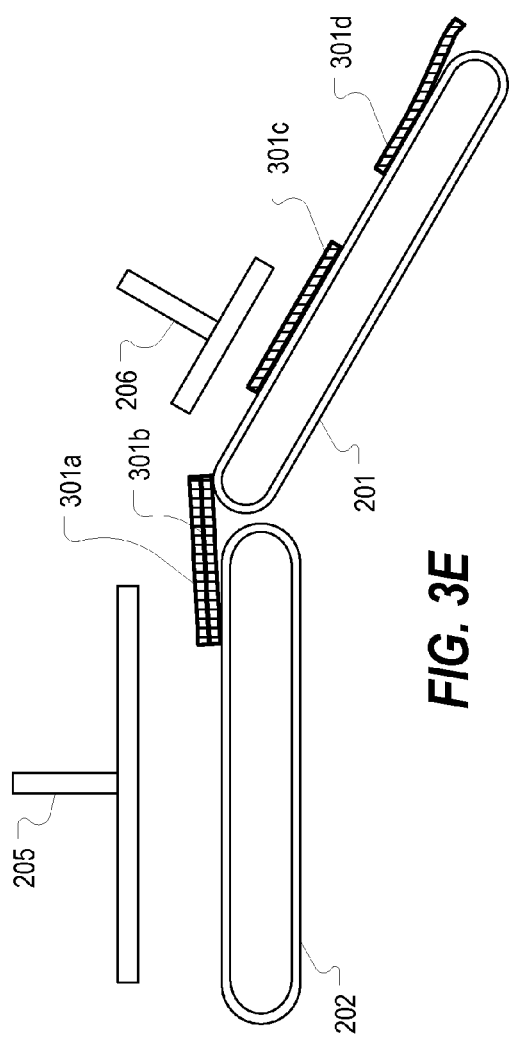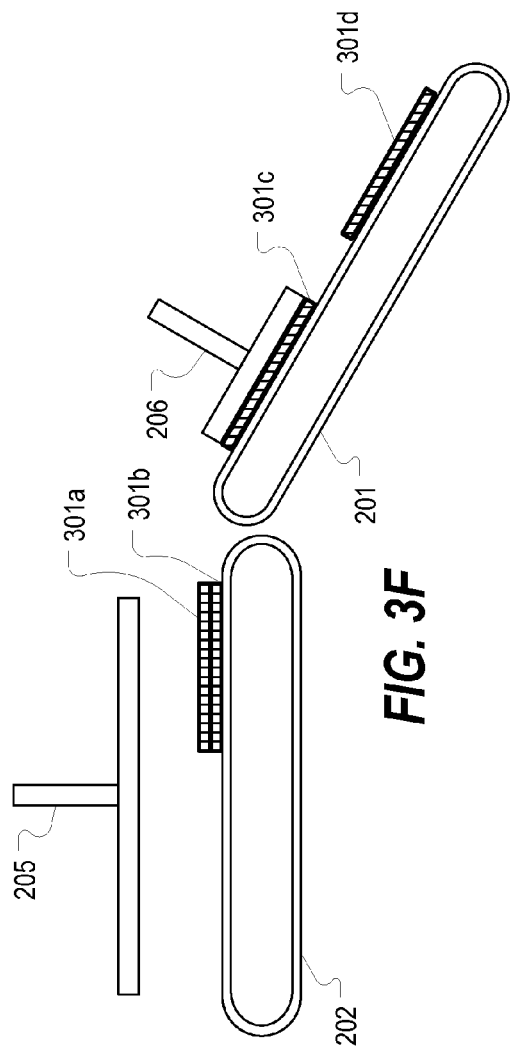

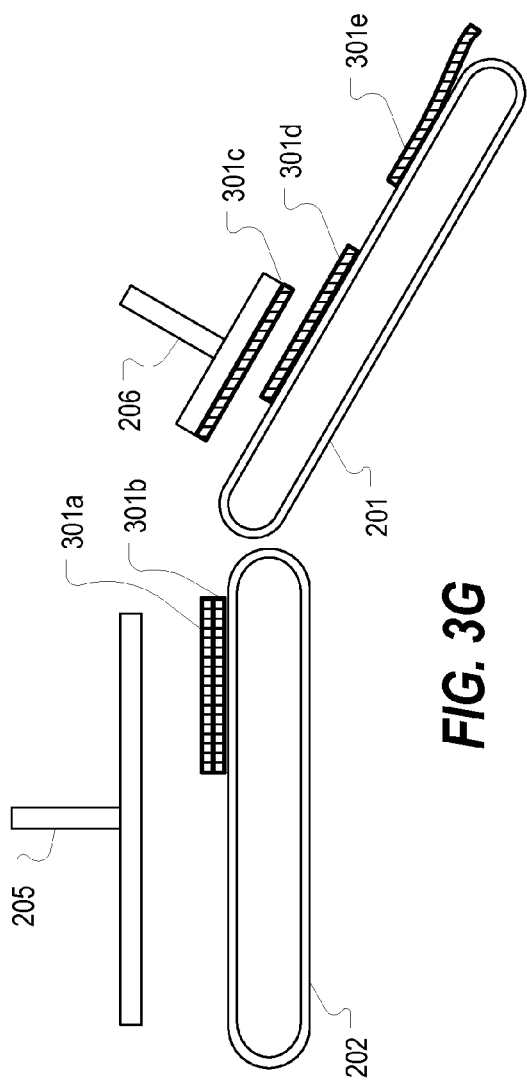
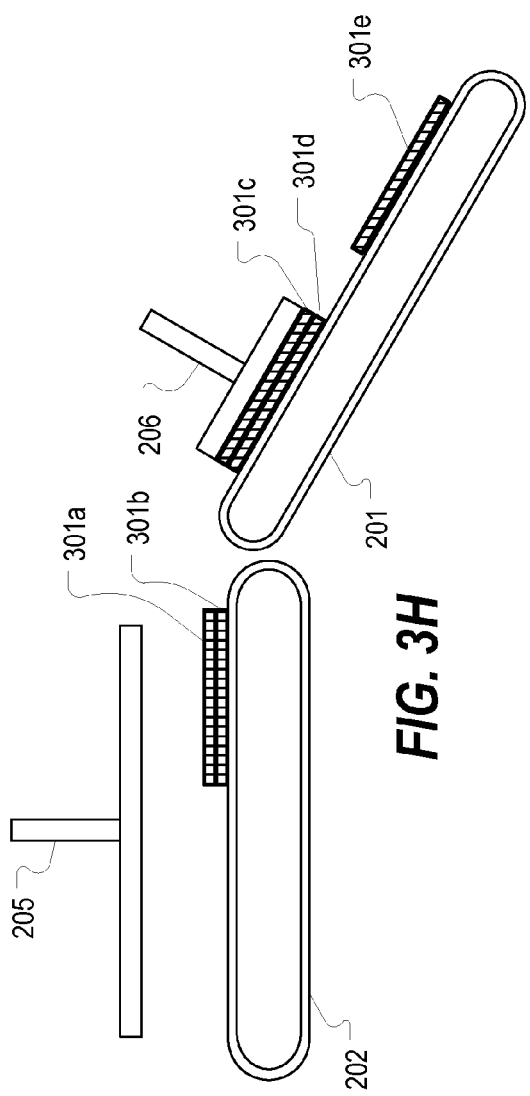

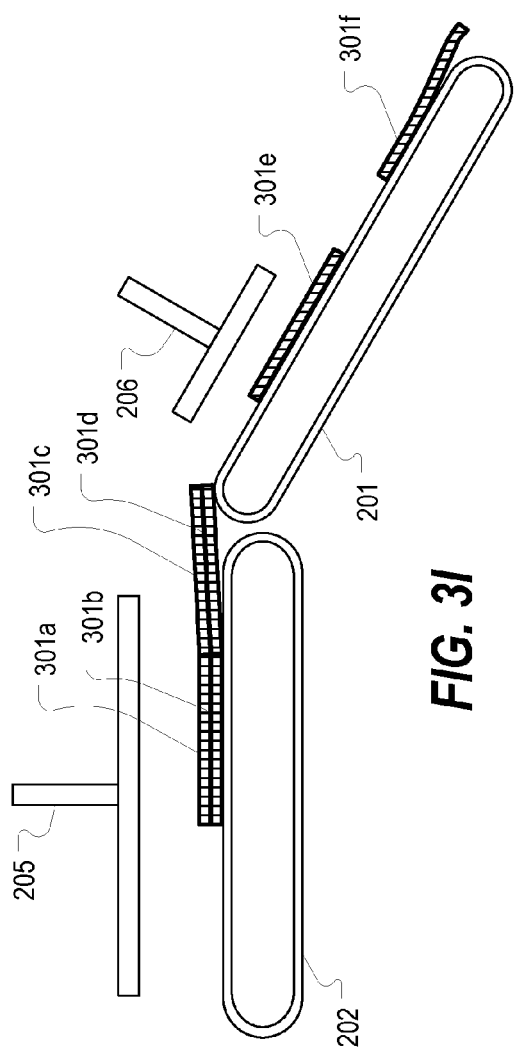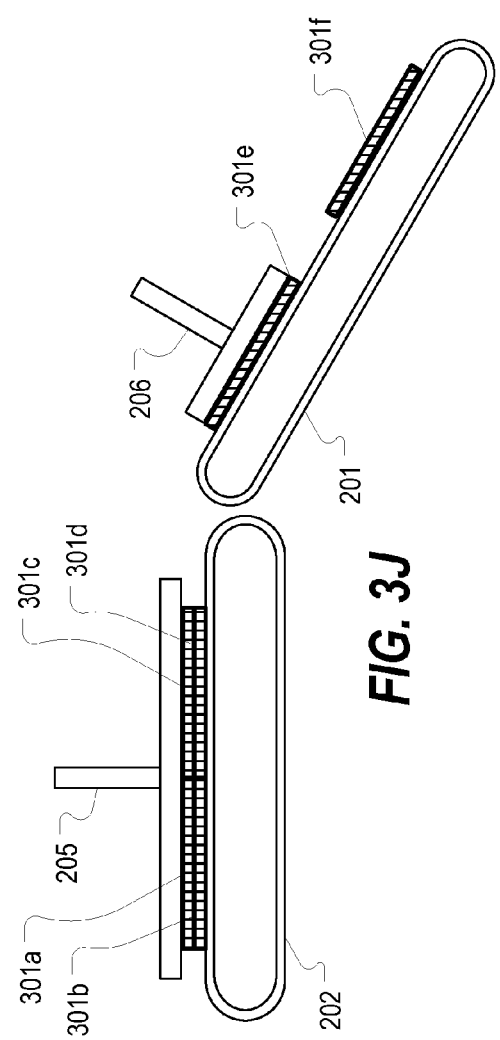

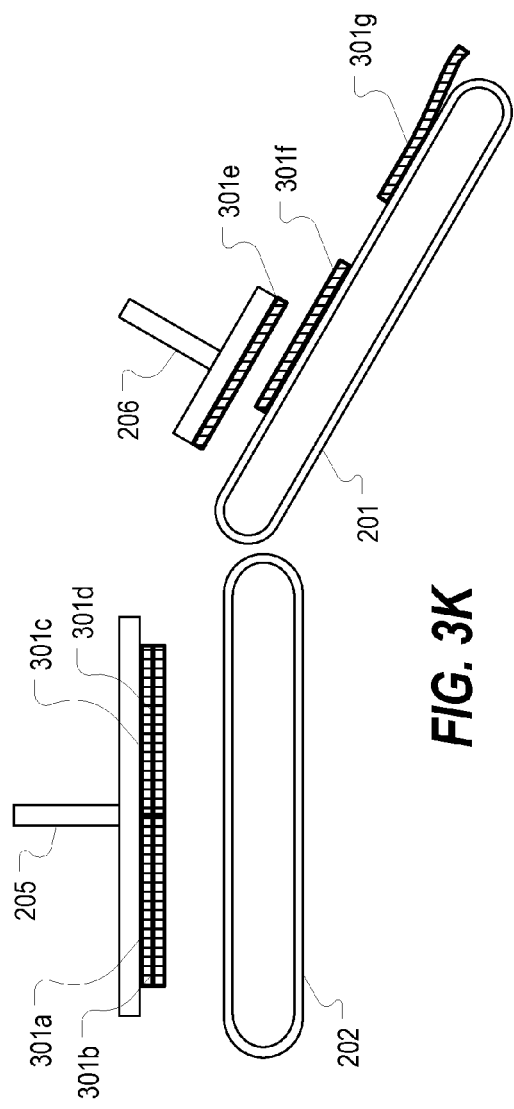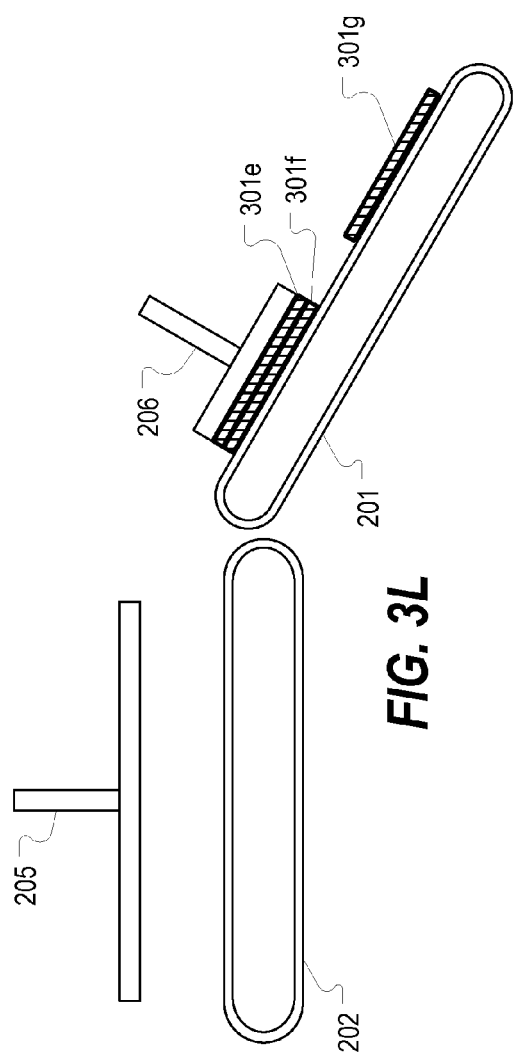
FIG. 3K
FIG. 3L

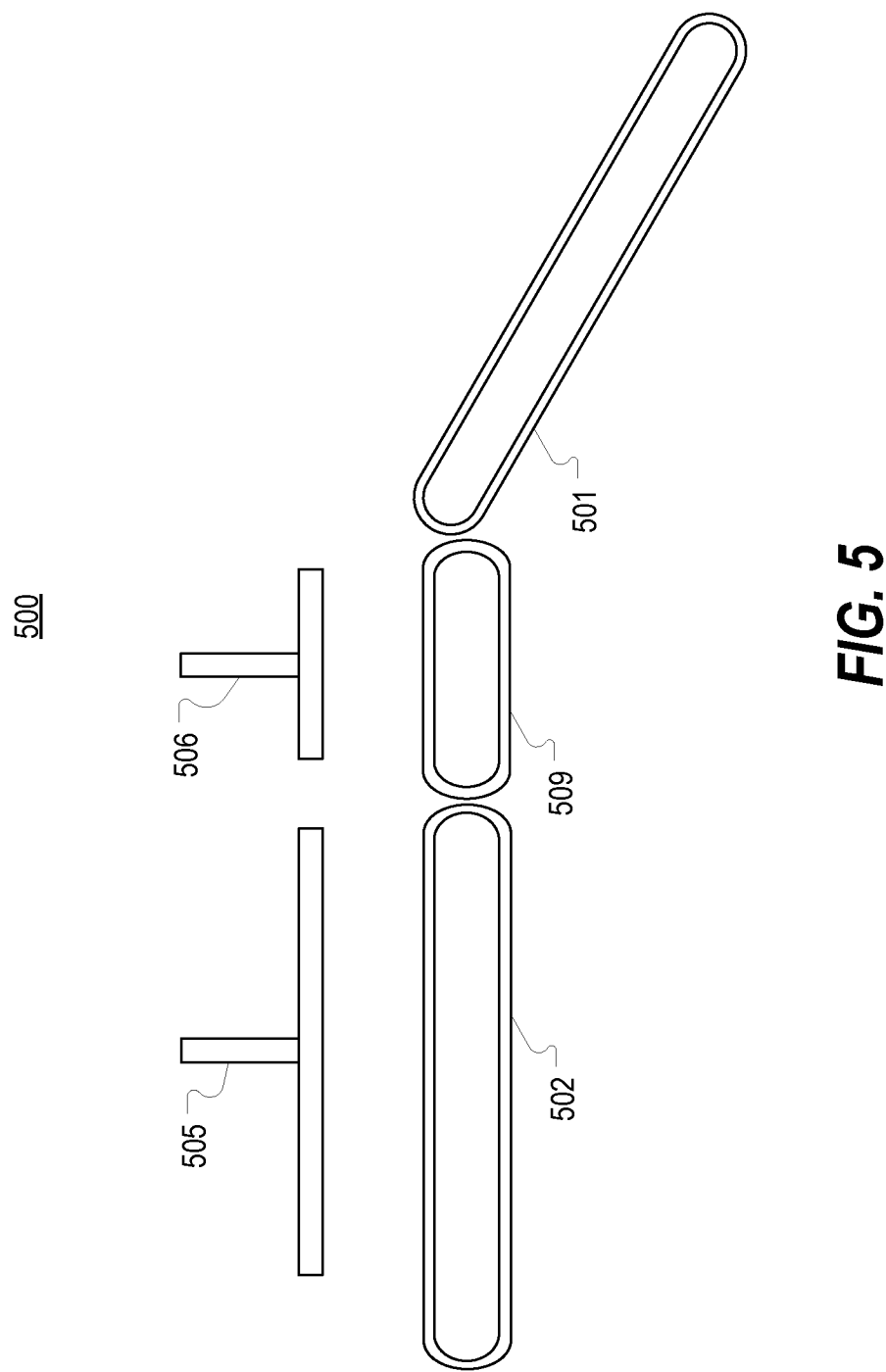

SOD HARVESTER HAVING PRELIMINARY STACKING HEAD

CROSS-REFERENCE TO RELATED APPLICATIONS

U.S. patent application Ser. No. 13/851,402 ("the '402 application") discloses techniques for accumulating multiple slabs of sod at a front end of a stacking conveyor prior to advancing the stacking conveyor to a position where the accumulated slabs are picked up. A sod harvester configured in accordance with the present invention could also be configured to perform the accumulation techniques described in the '402 application. Accordingly, the '402 application is incorporated herein by reference.

U.S. patent application Ser. No. 14/303,316 ("the '316 application") discloses various techniques for controlling the movement of the stacking conveyor and/or stacking head to maximize the rate at which the stacking head can remove sod from the stacking conveyor. A sod harvester configured in accordance with the present invention could also be configured to perform any of the techniques disclosed in the '316 application. Accordingly, the '316 application is incorporated herein by reference.

BACKGROUND

Turf grass (sod) is a living organism that must be handled properly to ensure its survival when it is removed from one location and transplanted to another. Sod is generally harvested using large machinery that cuts slabs of sod from the soil and stacks them on pallets.

FIG. 1 illustrates a portion of a sod harvesting machine 100 that includes a typical cutting head, conveyor system, and stacking system. The cutting head of FIG. 1 includes a chop mechanism 110, an oscillating blade 103, and a roller 104. Chop mechanism 110 is configured to periodically descend into the sod 151 to make vertical cuts defining an initial width/length of the slabs. Oscillating blade 103 oscillates back and forth underneath the sod to sever the slab from the underlying soil 150. Roller 103 applies pressure to the sod as it is cut to facilitate the cutting of clean slabs. Slabs cut by the cutting head are routed to conveyor 101 which lifts the slabs up to stacking conveyor 102 from which they are removed by a stacking head 105 for stacking on a pallet. Typically, the pallet is positioned adjacent to the stacking conveyor so that the stacking head can move back and forth between the stacking conveyor and pallet when stacking.

It is generally desirable to harvest sod as quickly as possible. However, various factors limit the speed at which sod can be harvested primary of which is the rate at which sod can be stacked on a pallet. For example, the ground speed of the sod harvester directly defines the rate at which sod is harvested. However, even if a sod harvester is capable of cutting sod from the ground at a faster rate, the sod harvester may still be limited by the rate at which the sod can be removed from the stacking conveyor and stacked on the pallet. In other words, the ground speed of sod harvester 100 is limited by the rate at which the stacking head 105 can remove sod from stacking conveyor 102.

Even if a stacking head can be operated quickly to increase the rate of sod harvesting, the increased rate does not necessarily yield a net gain in efficiency. For example, operating the stacking head at high rates can require substantial additional amounts of energy leading to increased fuel costs. These increased fuel costs may offset any gains resulting from the increased rate of sod harvesting. Also, operating at high rates increases the forces on the components of the stacking head leading to more frequent and costly repairs and corresponding downtime. Accordingly, the stacking head oftentimes forms the bottleneck during the sod harvesting process.

BRIEF SUMMARY

The present invention extends to a sod harvester that includes a preliminary stacking head for stacking slabs of sod prior to the stacked slabs being removed from a stacking conveyor by the stacking head. In this way, the stacking head can remove multiple layers of sod during a single stacking operation. By removing multiple layers of sod, the stacking head can move less frequently while still stacking sod at the same rate. This results in reduced fuel consumption and wear and tear on the stacking head while still enabling high rates of harvesting.

The preliminary stacking head can be configured in a similar manner as the stacking head. For example, the preliminary stacking head can be positioned overtop a conveyor and can be configured to pick up a slab of sod (e.g., by descending towards the slab of sod) as the slab travels along the conveyor. Once the preliminary stacking head has picked up a slab of sod, it can drop the slab on top of a trailing slab thereby forming a stack of slabs on the conveyor. In some embodiments, the conveyor over which the preliminary stacking head can be positioned is an inclined conveyor that transports slabs of sod from the ground to the stacking conveyor. Alternatively, in other embodiments, the preliminary stacking head could be positioned over an intermediate conveyor positioned between an inclined conveyor and the stacking conveyor.

After slabs of sod have been stacked on the conveyor, the stacked slabs can be advanced on the stacking conveyor to a position where the stacking head can remove the stacked slabs for final stacking on a pallet. In some embodiments, stacked slabs can be accumulated on the stacking conveyor prior to being advanced to the position where they will be removed from the stacking conveyor.

In one embodiment, the present invention is implemented as a sod harvester comprising a cutting head for cutting slabs of sod from the ground, a stacking conveyor, a stacking head positioned overtop the stacking conveyor, one or more conveyors for advancing the slabs of sod from the cutting head to the stacking conveyor, and a preliminary stacking head positioned overtop a first conveyor of the one or more conveyors. The preliminary stacking head is configured to form stacks of slabs on the first conveyor prior to the stacks of slabs being advanced to the stacking conveyor. The stacking head is configured to remove the stacks of slabs from the stacking conveyor.

In another embodiment, the present invention is implemented as a method for harvesting sod. Slabs of sod are cut from the ground. The slabs are advanced along one or more inclined conveyors that carry the slabs from the ground to a stacking conveyor. Prior to advancing the slabs onto the stacking conveyor, stacks of slabs are formed on the one or more inclined conveyors. The stacks of slabs are advanced onto the stacking conveyor and then removed from the stacking conveyor.

This summary is provided to introduce a selection of concepts in a simplified form that are further described below in the Detailed Description. This Summary is not intended to identify key features or essential features of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 3A-3L illustrate a sequence of views of the sod harvester of FIG. 2 depicting how the preliminary stacking head stacks slabs of sod on the inclined conveyor prior to the stacked slabs being advanced onto the stacking conveyor;

FIG. 5 illustrates an example of a sod harvester that includes a preliminary stacking head that is positioned overtop an intermediate conveyor.

DETAILED DESCRIPTION

Figure 1:
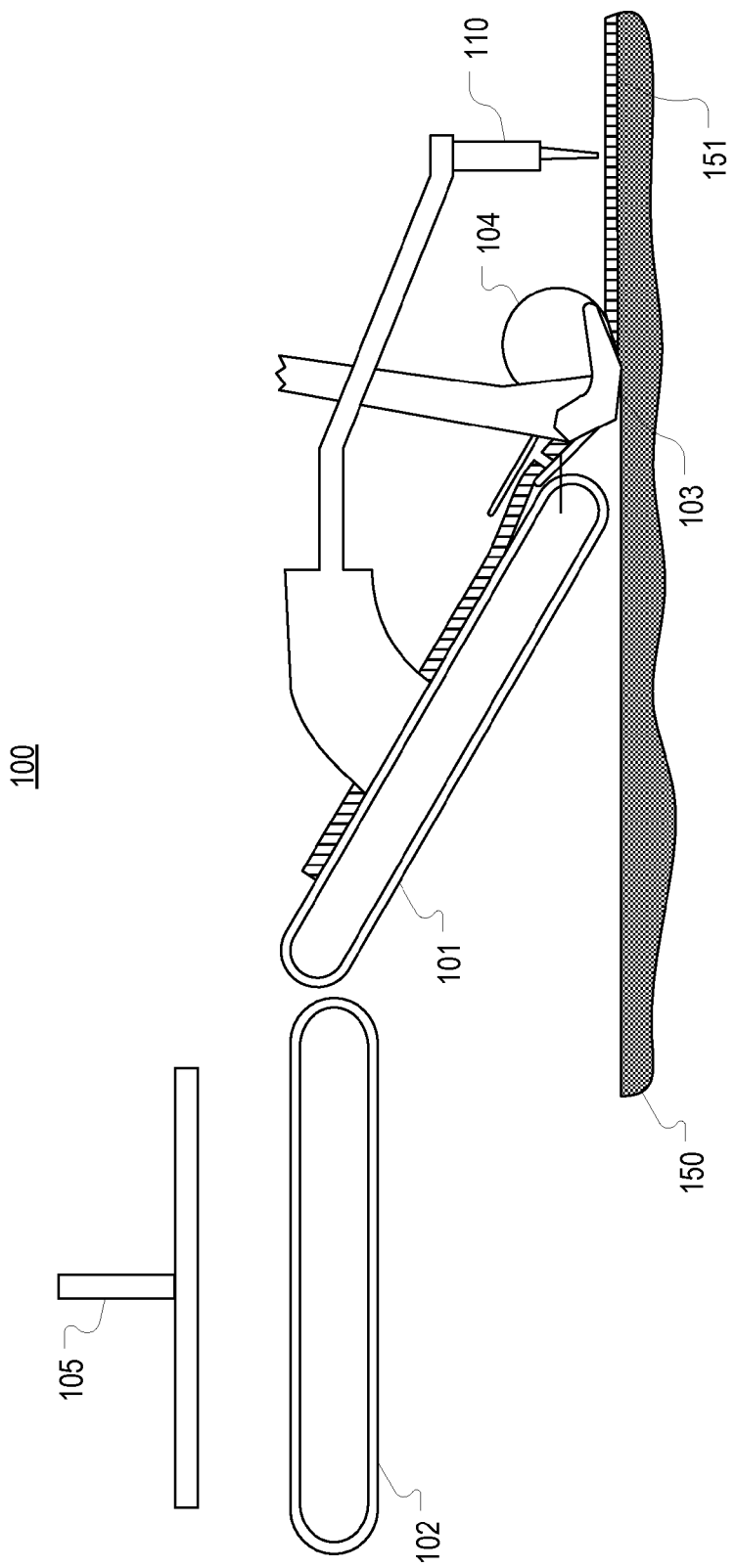
FIG. 1 illustrates an example of various components of a typical sod harvesting machine.
Figure 2:
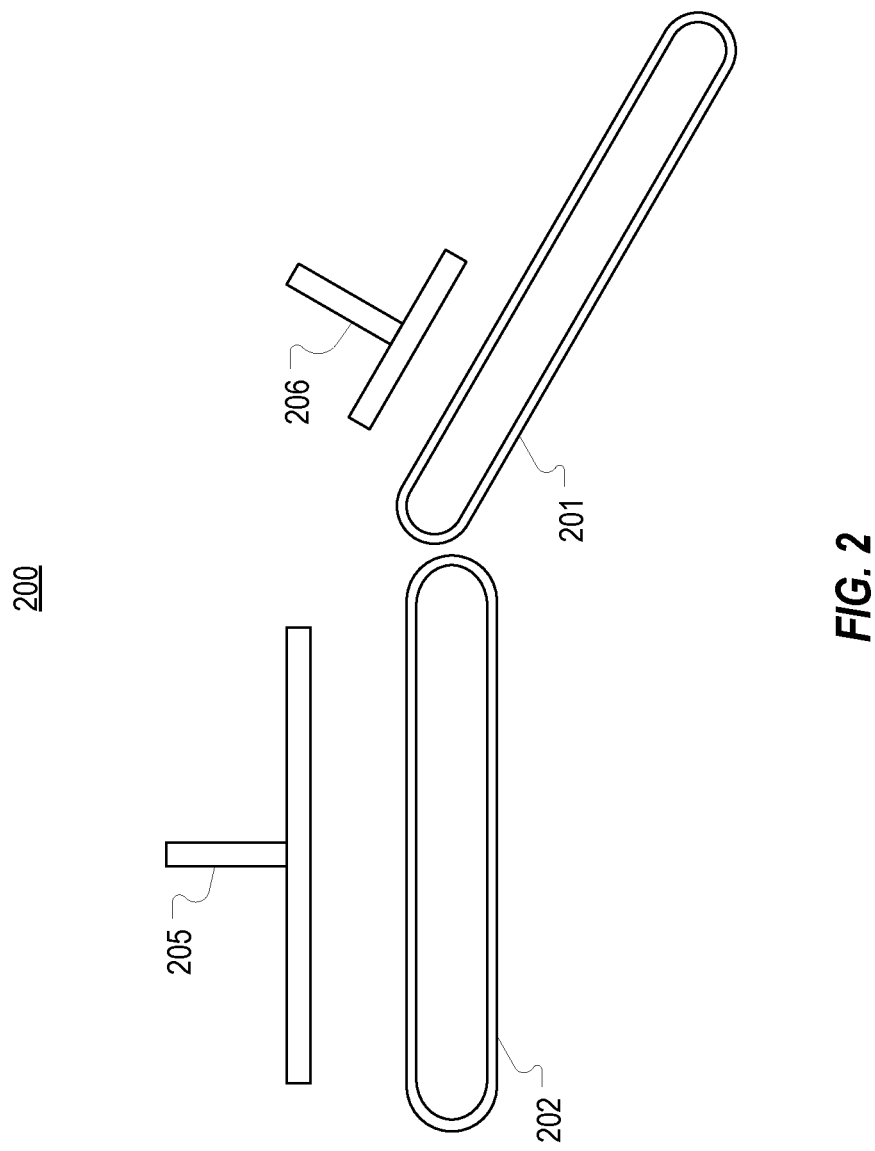
FIG. 2 illustrates an example of a sod harvester that includes a preliminary stacking head that is positioned overtop an inclined conveyor.

FIG. 2 illustrates components of a sod harvester 200 that is configured in accordance with embodiments of the present invention. Although not shown, sod harvester 200 would include a cutting head for removing slabs of sod from the ground and delivering the slabs to inclined conveyor 201. Although inclined conveyor 201 is shown as a single conveyor, more than one inclined conveyor could be used to carry slabs of sod from the ground to stacking conveyor 202.

Inclined conveyor 201 can preferably be operated at a speed that is slightly faster than ground speed so that a gap exists between each slab of sod as the slabs travel along inclined conveyor 201. A stacking head 205 can be employed to remove the slabs of sod from stacking conveyor 202 and to stack the slabs on a pallet. Typically, the pallet can be positioned alongside stacking conveyor 202; however, the position of the pallet is not essential to the invention. Examples of stacking head 205 and its operation are disclosed in the '316 application as well as in U.S. Pat. No. 9,022,720 titled "Electrically Operated Turf Stacking System For Sod Harvesting Machine" which is incorporated herein by reference. The present invention, however, should not be limited to any particular configuration of stacking head 205 as long as stacking head 205 is configured to pick up stacked slabs of sod as will be further described below.

In accordance with embodiments of the present invention, sod harvester 200 also includes a preliminary stacking head 206 which is used to stack slabs of sod while the slabs of sod are positioned on inclined conveyor 201. Preliminary stacking head 206 can be configured to pick up a leading slab of sod and retain it until a trailing slab of sod is positioned under preliminary stacking head 206. Then, preliminary stacking head 206 can release the leading slab of sod to stack it on top of the trailing slab of sod. The stacked slabs of sod can then continue to travel along inclined conveyor 201 and to stacking conveyor 202. The stacked slabs can then be removed from stacking conveyor 202 by stacking head 205 for stacking on a pallet.

Preliminary stacking head 206 can be configured to pick up and release a slab of sod in any suitable manner. For example, preliminary stacking head 206 can descend towards inclined conveyor 201, secure the leading slab, ascend to await the trailing slab, descend to release the leading slab on top of the trailing slab, and then ascend to await the next slab. Alternatively, preliminary stacking head 206 may simply drop the leading slab on the trailing slab without descending. The manner in which preliminary stacking head 206 secures a slab is not essential to the invention, and any suitable manner for securing a slab (e.g., clamping the blades of grass, puncturing through the slab, etc.) may be used.

Figure 3A:
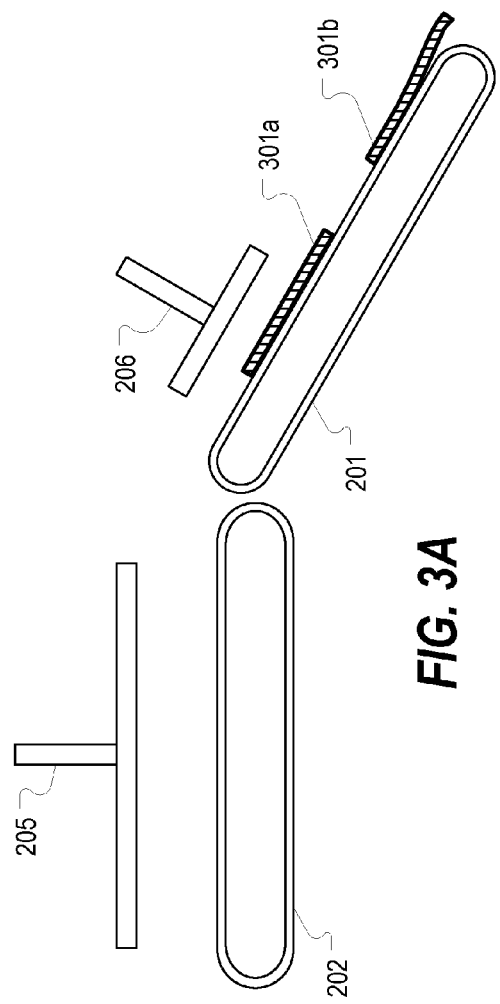

FIGS. 3A-3L illustrate a sequence of views of sod harvester 200 during operation of the sod harvester. FIG. 3A can represent a state of sod harvester 200 when slabs of sod are beginning to travel up inclined conveyor 201 but when no slabs are positioned on stacking conveyor 202 (e.g., when sod harvester 200 begins cutting slabs of sod from the ground).

Figure 3B:
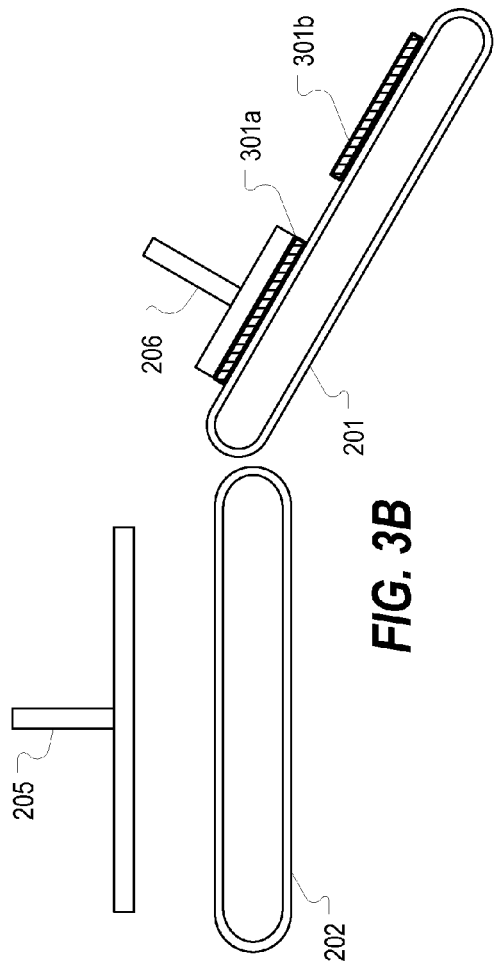

As shown in FIG. 3A, slabs 301a, 301b are being advanced along inclined conveyor 201. Preliminary stacking head 206 is in a raised position to allow slab 301a to pass underneath. As slab 301a is advanced underneath it, preliminary stacking head 206 descends to pick up slab 301a as is shown in FIG. 3B. It is noted that inclined conveyor 201 does not stop during this process. Preliminary stacking head 206 can secure and remove slab 301a from inclined conveyor 201 quickly enough that the inclined conveyor 201 can continue to advance. However, it is possible in some embodiments that inclined conveyor 201 could momentarily stop or otherwise slow down while preliminary stacking head 206 operates.

Figure 3C:
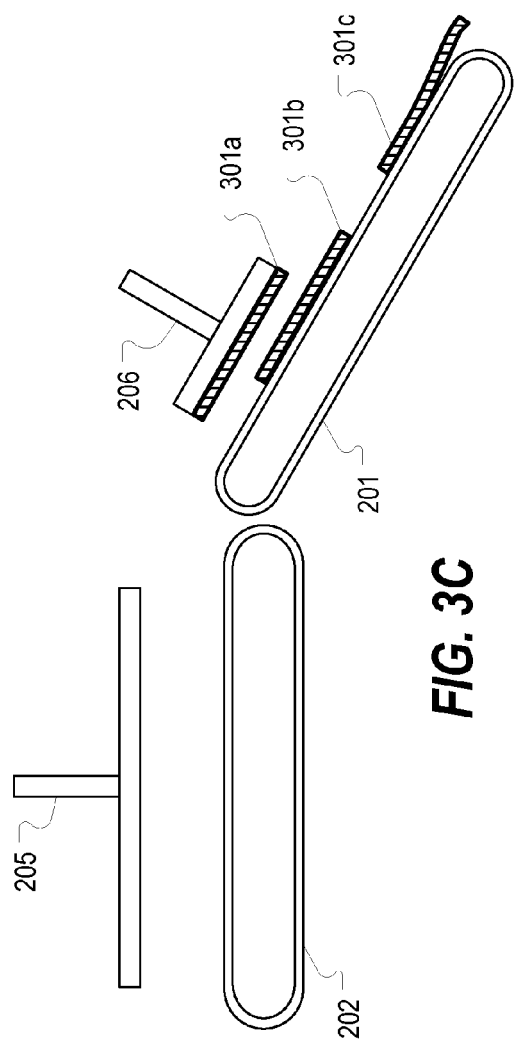

FIG. 3C illustrates that, after securing slab 301a, preliminary stacking head 206 ascends to allow slab 301b to travel underneath preliminary stacking head 206 and therefore underneath slab 301a. The advancement of inclined conveyor 201 also causes slab 301c to be advanced onto inclined conveyor 201.

Figure 3D:
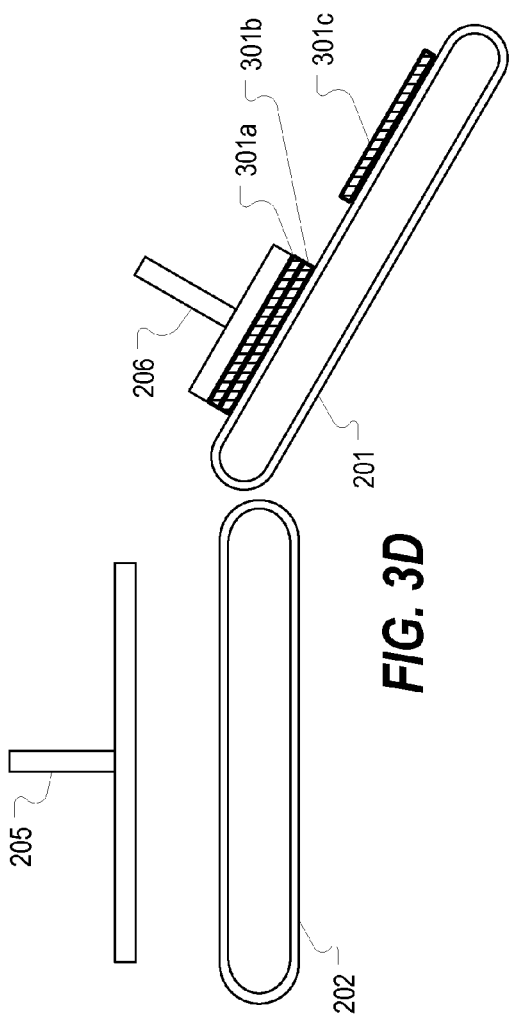

As inclined conveyor 201 advances slab 301b underneath slab 301a, preliminary stacking head 206 can place slab 301a on top of slab 301b. FIG. 3D illustrates that preliminary stacking head 206 descends to place slab 301a on top of slab 301b. However, preliminary stacking head 206 may also drop slab 301a without descending. It is again noted that inclined conveyor 201 does not need to stop during this process.

At this point, slab 301a is stacked on top of slab 301b while these slabs are positioned on inclined conveyor 201. In this stacked configuration, slabs 301a, 301b continue to advance upwardly along inclined conveyor 201 towards stacking conveyor 202 as shown in FIG. 3E. After releasing slab 301b, preliminary stacking head 206 can again ascend to await slab 301c.

FIG. 3F illustrates that inclined conveyor 201 has continued to advance until slab 301c is positioned underneath preliminary stacking head 206 at which point preliminary stacking head 206 descends to pick up slab 301c. This advancement of inclined conveyor 201 also causes slab 301d to advance onto inclined conveyor 201.

In some embodiments, once the stacked slabs 301a, 301b have reached stacking conveyor 202, the stacked slabs may be positioned at a front end of stacking conveyor 202 for accumulation with other stacked slabs. A suitable process for accumulating stacked slabs is described in the '402 application. FIG. 3F represents an embodiment where stacking conveyor 202 is advanced sufficiently to cause stacked slabs 301a, 301b to be positioned fully on stacking conveyor 202 and is then stopped to await the next set of stacked slabs.

FIG. 3G illustrates that preliminary stacking head 206 has secured slab 301c and ascended while slab 301d continues to advance along inclined conveyor 201. As slab 301d is positioned underneath slab 301c, preliminary stacking head 206 can release slab 301c on top of slab 301d as shown in FIG. 3H.

The stacked slabs 301c, 301d are then advanced towards stacking conveyor 202 as shown in FIG. 3I. As leading edges of stacked slabs 301c, 301d reach trailing edges of stacked slabs 301a, 301b, stacking conveyor 202 can again be advanced to cause the two sets of stacked slabs to be positioned together (i.e., without a gap) on stacking conveyor 202 in accordance with the techniques described in the '402 application.

In this example, it will be assumed that stacking head 205 is configured to remove two sets of stacked slabs (i.e., four slabs) at a time. However, stacking head 205 could also be configured to remove any number of sets of stacked slabs (e.g., three sets or six total slabs) at a time depending on the dimensions of the slabs. In any case, once the appropriate number of sets of stacked slabs is accumulated on stacking conveyor 202, the stacking conveyor can be advanced to position the sets of stacked slabs underneath stacking head 205. As shown in FIG. 3J, stacking conveyor 202 can be advanced to position stacked slabs 301a, 301b and stacked slabs 301c, 301d underneath stacking head 205 at which point stacking head 205 can descend to secure each of slabs 301a-301d as shown in FIG. 3J. Once all four slabs are secured in their stacked configuration, stacking head 205 can remove them from stacking conveyor 202 for stacking on a pallet (not shown) as is shown in FIGS. 3K and 3L. In this way, stacking head 205 stacks multiple layers of sod on the pallet with each stacking operation. FIGS. 3K and 3L further illustrate how this preliminary stacking process can continue on slabs 301e, 301g, etc.

Stacking head 205 can secure both layers of the stacked slabs in any suitable manner such as by piercing through both layers. Suitable examples of a stacking head 205 are described in the '316 application. Additionally, the techniques described in the '316 application for controlling movement of the stacking conveyor and/or stacking head can be used to further increase the rate at which stacking head 205 can remove slabs from stacking conveyor 202.

Because stacking head 205 removes two layers of slabs with each stacking operation, stacking head 205 effectively doubles the number of slabs that are stacked with each stacking operation. Accordingly, the stacking operation does not need to be performed as frequently as when a single layer is stacked at a time. Given that the stacking operation is oftentimes the bottleneck during the harvesting process, the present invention can allow the sod harvester to be operated at greater ground speeds.

Further, although stacking double the amount of slabs increases the amount of energy that is required to perform a single stacking operation (e.g., due to the increased weight that stacking head 205 must move), the reduction in the number of stacking operations that must be performed provides a net energy savings. Therefore, the present invention provides benefits in the form of efficiency and yield.

Although preliminary stacking head 206 has been described as forming stacks of two slabs, the present invention also extends to embodiments where preliminary stacking head 206 is used to form stacks of three (or possibly more) slabs. In such cases, the process of stacking three slabs on inclined conveyor 201 would be performed in a similar manner as described above except that preliminary stacking head 206 would pick up slab 301b while already securing slab 301a and then place both slabs 301a and 301b on slab 301c. Similarly, slabs 301d and 301e would be placed on slab 301f to form two sets of three stacked slabs.

Figure 4A:
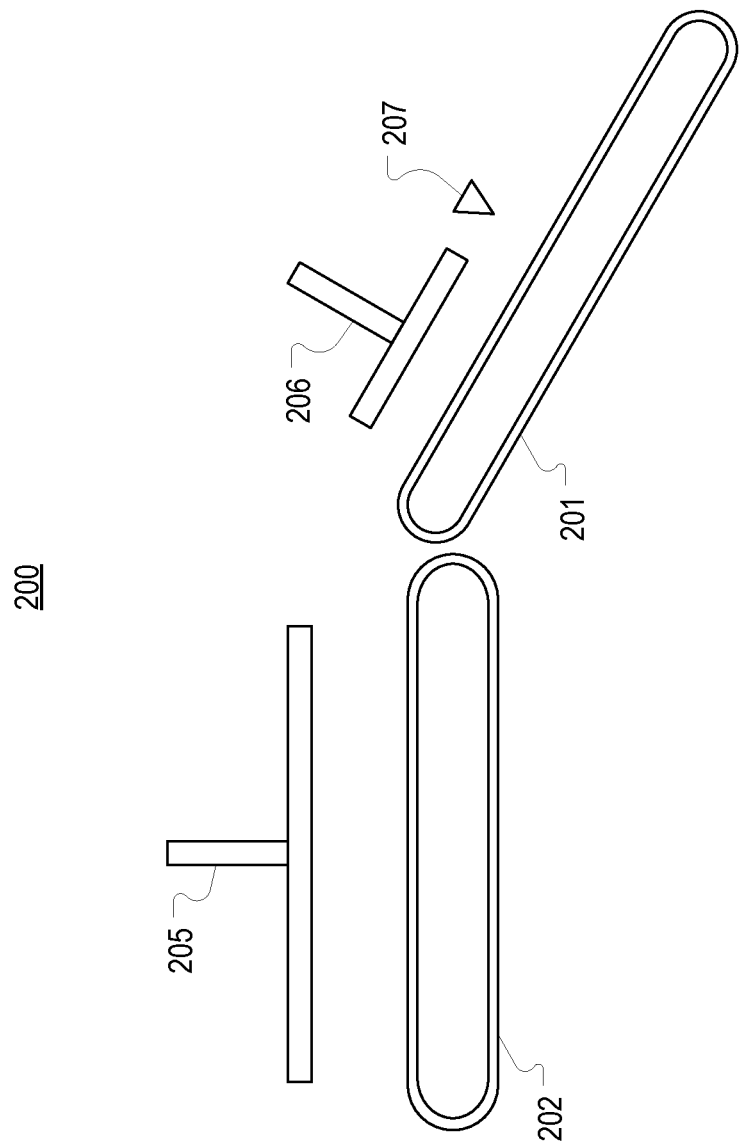
FIGS. 4A, 4B, and 4E each illustrates the sod harvester of FIG. 2 along with one or more sensors that could be employed to implement proper timing of the preliminary stacking operation.

In order to operate preliminary stacking head 206 with the appropriate timing, sod harvester 200 may include one or more sensors. FIG. 4A illustrates an example of how a sensor 207 could be positioned overtop inclined conveyor 201 prior to preliminary stacking head 206. In this example, sensor 207 could be an optical sensor that senses the leading and/or trailing edge of a slab of sod as the slab travels along inclined conveyor 201. Other positions and/or types of sensors could alternatively or additionally be provided. In short, any sensor that can be used to identify the position of a slab of sod on inclined conveyor 201 could be used.

Based on input from sensor 207, a control unit (not shown) could calculate when a slab will be positioned underneath preliminary stacking head 206 and can control the operation of preliminary stacking head 206 accordingly. For example, the control unit could be configured to receive input from sensor 207 indicative of when the leading and trailing edges are sensed. Based on this input (and assuming the control unit knows the dimensions of the slab), the control unit could calculate the speed at which inclined conveyor 201 is operating, and, based on this calculated speed, identify the moment when the slab will be positioned underneath preliminary stacking head 206. Alternatively, if the speed of inclined conveyor 201 is a known parameter (e.g., based on input from another sensor), the control unit could be configured to receive input from sensor 207 indicative of a single edge of the slab (i.e., of either the leading or trailing edge) and from such input identify when to operate preliminary stacking head 206.

Figure 4B:
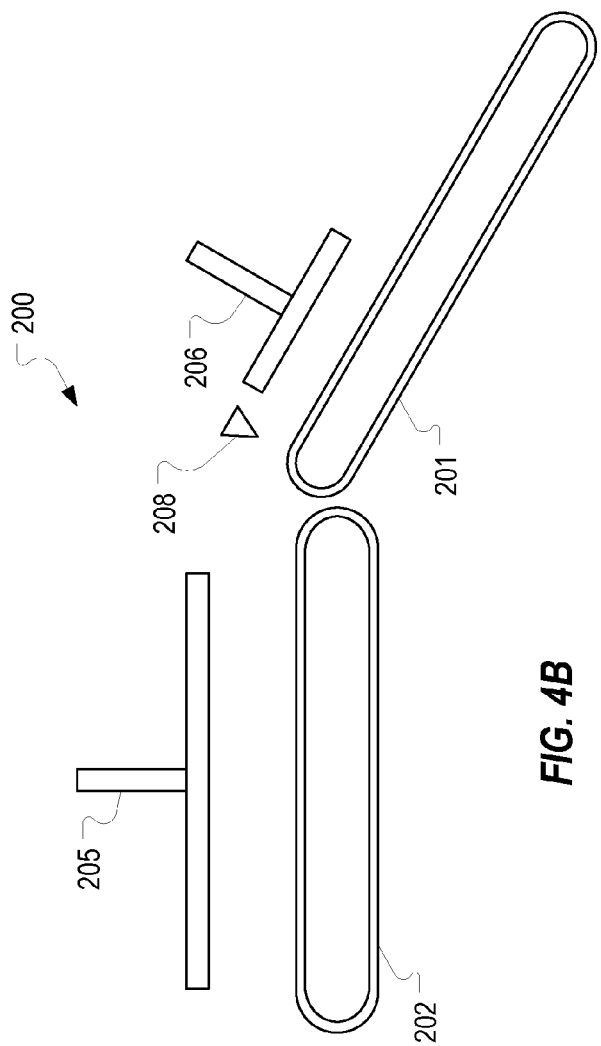
Figure 4C:
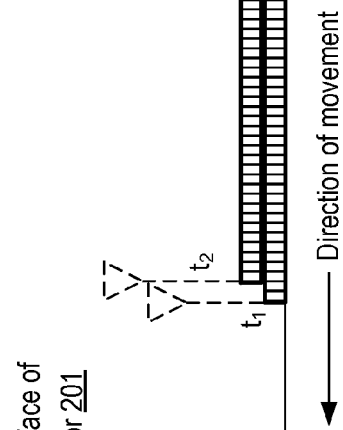
FIGS. 4C and 4D represent how the sensor shown in FIG. 4B can detect a misalignment in stacked slabs.
Figure 4D:
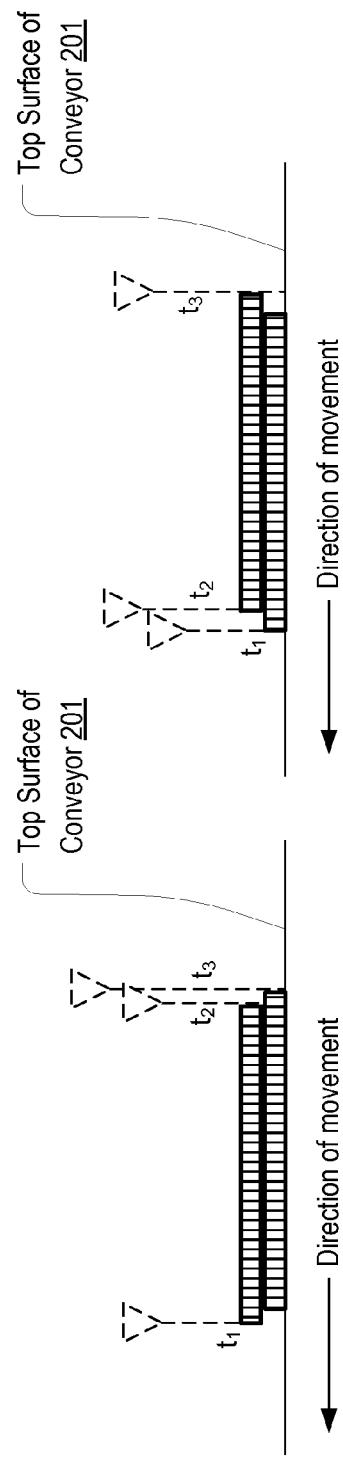
Figure 4E:
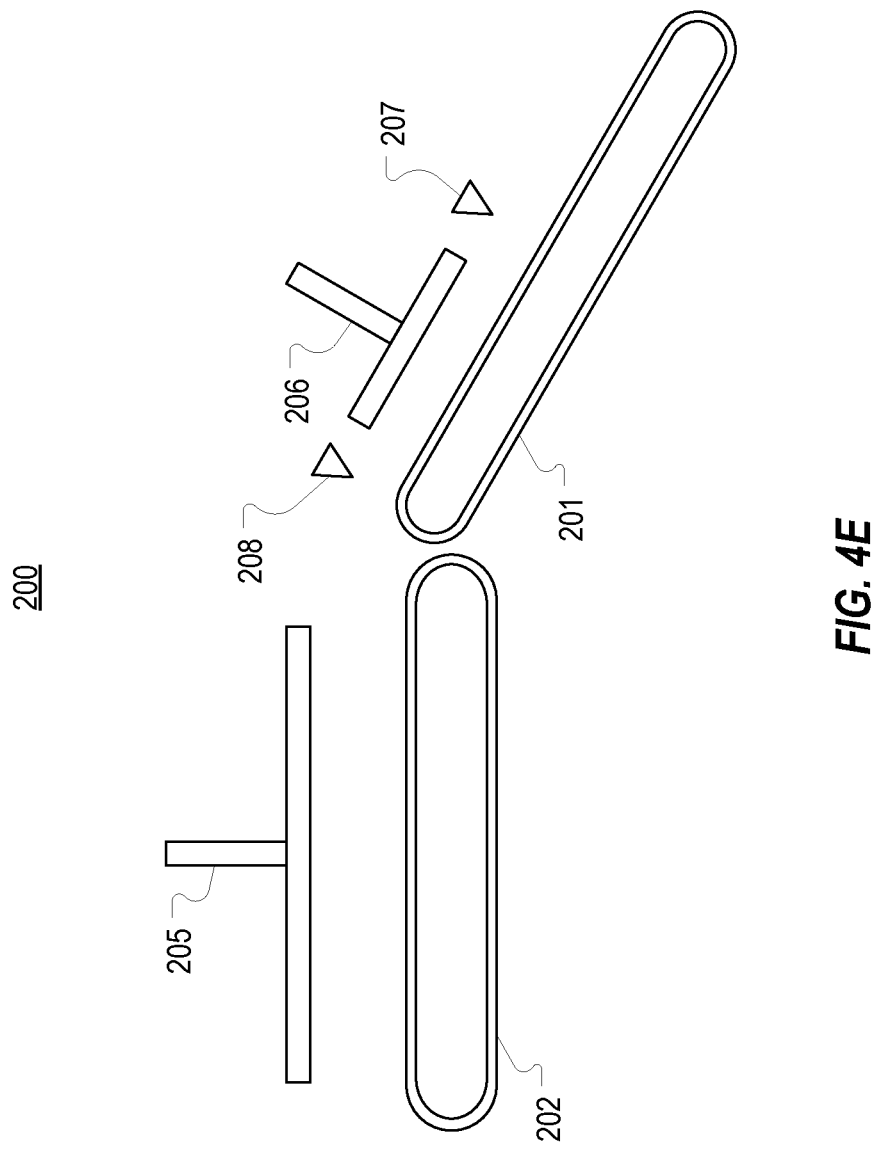

FIG. 4B illustrates an example of how a sensor 208 could be positioned after preliminary stacking head 206 (e.g., overtop inclined conveyor 201 or stacking conveyor 202). Sensor 208 could be used to verify whether preliminary stacking head 206 is stacking slabs in alignment and could be used alone or in conjunction with sensor 207 (e.g., as shown in FIG. 4E) to monitor proper operation of preliminary stacking head 206.

If slabs were stacked out of alignment, sensor 208 could detect the misalignment in either the leading edges or the trailing edges of the slabs. FIGS. 4C and 4D illustrate instances where the top slab is released too soon and too late respectively. In each of FIGS. 4C and 4D, two stacked slabs are represented as moving from right to left along the top surface of inclined conveyor 201 as they pass under sensor 208 (represented in dashed lines). Whenever slabs are stacked in misalignment, sensor 208 (which can preferably be an optical sensor) can identify the misalignment by detecting a three-step transition as the stacked slabs pass under the sensor.

In FIG. 4C, because the top slab was released too soon, the leading edge of the top slab overlaps the leading edge of the bottom slab. Therefore, as the stacked slabs pass under sensor 208, the sensor will detect a first transition from the top surface of inclined conveyor 201 to the top surface of the top slab. In FIG. 4C, this first transition is represented as occurring at time $t_1$. Then, due to the misalignment, sensor 208 will detect a second transition from the top surface of the top slab to the top surface of the bottom slab. This second transition is represented as occurring at time $t_2$. Shortly thereafter, sensor 208 will detect a third transition from the top surface of the bottom slab to the top surface of inclined conveyor 201. This third transition is represented as occurring at time $t_3$.

In FIG. 4D, because the top slab was released too late, the trailing edge of the top slab overlaps the trailing edge of the bottom slab. In this case, sensor 208 will still detect a three-step transition in a similar manner as described above; however, the spacing of the transitions will differ. In particular, in the case depicted in FIG. 4D, the second transition occurs shortly after the first transition. Of course, if the slabs are perfectly aligned, sensor 208 would only detect two transitions.

A control unit can be configured to process signals received from sensor 208 indicative of the occurrence of these transitions and cause the operation of preliminary stacking head 206 to be updated appropriately. For example, if sensor 208 provides signals indicative of a two-step transition (i.e., indicative that the slabs are aligned), the control unit can continue to operate preliminary stacking head 206 with the same timing. However, if sensor 208 provides signals indicative of a three-step transition, the control unit can process the signals to identify whether the top slab is being released too early or too late. For example, by comparing the amount of time between the first and second transitions to the amount of time between the second and third transitions, the control unit can determine how the slabs are misaligned. In particular, if the amount of time between the first and second transitions is greater than the amount of time between the second and third transitions (as represented in FIG. 4C), the control unit can determine that the top slab is being released too early. Further, in such cases, the amount of time between the second and third transitions can be used to identify how early the top slab is being released (e.g., with reference to the speed of the inclined conveyor as determined by sensor 207 or another sensor). Similarly, if the amount of time between the first and second transitions is less than the amount of time between the second and third transitions (as shown in FIG. 4D), the control unit can determine that the top slab is being released too late. Further, in such cases, the amount of time between the first and second transitions can be used to identify how late the top slab is being released. In either case, whenever the amount of time between the corresponding transitions exceeds some threshold, the control unit can update the timing of the operation of preliminary stacking head 206 to attempt to better align subsequently stacked slabs.

In one particular example, the control unit may employ a timing offset to control the operation of preliminary stacking head 206 with reference to a signal from sensor 207. For example, when receiving a signal from sensor 207 identifying the leading edge of a slab, the control unit may employ the timing offset to determine the time when preliminary stacking head 206 should be operated (e.g., descended). Based on feedback from sensor 208, the control unit may update this timing offset to ensure that slabs remain in alignment.

In some embodiments, this timing offset may be biased in one direction. For example, the control unit may be configured to cause the timing offset to slowly decrease over time such that slabs are dropped earlier over time. This would cause the slabs to become misaligned as shown in FIG. 4C. However, feedback from sensor 208 could be employed to ensure that the amount of misalignment remains within reasonable limits. In other words, the timing of the operation of preliminary stacking head 206 can include a built-in bias towards early release of a slab to ensure a small but detectable amount of misalignment exists. Feedback from sensor 208 can then be used to periodically correct for the bias (e.g., by increasing the timing offset by a suitable amount). One benefit of this approach is that it can minimize the number of sensors and/or the complexity of the timing algorithm. In particular, the bias can ensure that there is always a detectable amount of misalignment at the trailing edges (e.g., that $t_3-t_2 \neq 0$) and therefore, the control unit does not need to be configured to detect whether misalignment on the leading edge is occurring (i.e., the control unit will always know that the top slab is not being dropped too late and only needs to ensure that the misalignment on the trailing edges does not grow too big). This same technique could be used to ensure that misalignment always exist on the leading edge. In other words, the built-in bias could cause the timing offset to slowly increase over time.

Although the above description provides an example of a sod harvester that includes a preliminary stacking head overtop an inclined conveyor, the present invention also extends to embodiments where the preliminary stacking head is positioned overtop an intermediate (i.e., non-inclined) conveyor positioned between an inclined conveyor and the stacking conveyor. FIG. 5 depicts an example of a sod harvester 500 that includes one or more inclined conveyors 501, a stacking conveyor 502, a stacking head 505 positioned overtop stacking conveyor 502, an intermediate conveyor 509, and a preliminary stacking head 506 positioned overtop intermediate conveyor 509. Preliminary stacking head 506 can operate in substantially the same manner as described above to form stacks of slabs on intermediate conveyor 509.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A sod harvester comprising:
a cutting head for cutting slabs of sod from the ground;
a stacking conveyor;
a stacking head positioned overtop the stacking conveyor;
one or more conveyors for advancing the slabs of sod from the cutting head to the stacking conveyor; and
a preliminary stacking head positioned overtop a first conveyor of the one or more conveyors, the preliminary stacking head being configured to form stacks of slabs on the first conveyor prior to the stacks of slabs being advanced to the stacking conveyor, the preliminary stacking head forming each stack of slabs by picking up a leading slab from the first conveyor and then releasing the leading slab onto a trailing slab once the trailing slab has been advanced on the first conveyor to be positioned under the preliminary stacking head;

wherein the stacking head is configured such that, after each stack of slabs is advanced from the first conveyor to the stacking conveyor, the stacking head picks up the stack of slabs from the stacking conveyor and stacks the stack of slabs on a pallet.

2. The sod harvester of claim 1, wherein the first conveyor is an inclined conveyor.

3. The sod harvester of claim 1, wherein the first conveyor is positioned between an inclined conveyor and the stacking conveyor.

4. The sod harvester of claim 1, wherein the stacks of slabs comprise stacks of two slabs.

5. The sod harvester of claim 1, wherein each stack of slabs comprises more than two slabs such that the preliminary stacking head forms each stack of slabs by sequentially picking up multiple slabs from the first conveyor and then releasing the multiple slabs onto a trailing slab.

6. The sod harvester of claim 1, wherein dropping the leading slab on the trailing slab comprises descending towards the first conveyor to release the leading slab on top of the trailing slab.

7. The sod harvester of claim 1, further comprising:
one or more sensors positioned prior to the preliminary stacking head, the one or more sensors configured to generate one or more signals when an edge of the slabs of sod is detected.

8. The sod harvester of claim 7, further comprising:
a control unit for controlling the preliminary stacking head based on the one or more signals received from the one or more sensors.

9. The sod harvester of claim 1, further comprising:
one or more sensors positioned after the preliminary stacking head, the one or more sensors configured to generate one more signals when an edge of a slab in the stacks of slabs is detected.

10. The sod harvester of claim 9, further comprising:
a control unit for identifying, based on the one or more signals received from the one or more sensors, when the slabs in the stacks of slabs are misaligned.

11. The sod harvester of claim 10, wherein the control unit is configured to modify a timing of operation of the preliminary stacking head when misalignment is identified.

12. The sod harvester of claim 11, wherein identifying misalignment comprises identifying whether the preliminary stacking head is releasing a top slab on a bottom slab of the stacks of slabs too early or too late, and wherein modifying the timing of operation of the preliminary stacking head comprises modifying when the preliminary stacking head releases the top slab on the bottom slab.

13. The sod harvester of claim 11, wherein modifying the timing of operation of the preliminary stacking head comprises modifying a timing offset.

14. The sod harvester of claim 13, wherein the timing offset is biased.

15. A method for harvesting sod with a sod harvester, the method comprising:
cutting slabs of sod from the ground with a cutting head of the sod harvester;
advancing the slabs along one or more conveyors that carry the slabs from the ground to a stacking conveyor;
prior to advancing the slabs onto the stacking conveyor, forming stacks of slabs on a first conveyor of the one or more conveyors with a first stacking head that is positioned overtop the first conveyor, the first stacking head forming each stack by picking up a leading slab from the first conveyor and then releasing the leading slab onto a trailing slab once the trailing slab has been advanced on the first conveyor to be positioned under the first stacking head;
advancing the stacks of slabs onto the stacking conveyor; and
removing the stacks of slabs from the stacking conveyor with a second stacking head that is positioned overtop the stacking conveyor.

16. The method of claim 15, wherein the first conveyor is an inclined conveyor or is positioned between an inclined conveyor and the stacking conveyor.

17. The method of claim 15, wherein the second stacking head removes multiple stacks of slabs from the stacking conveyor at the same time.

18. The method of claim 15, wherein each stack of slabs comprises more than two slabs such that the first stacking head forms each stack of slabs by sequentially picking up multiple slabs from the first conveyor and then releasing the multiple slabs onto a trailing slab.

19. The method of claim 15, further comprising:
detecting an amount of overlap in the stacks of slabs; and
adjusting a timing of operation of the first stacking head based on the amount of overlap.

20. A sod harvester comprising:
a cutting head for cutting slabs of sod from the ground;
a stacking conveyor;
a stacking head positioned overtop the stacking conveyor;
one or more inclined conveyors for advancing the slabs of sod from the cutting head to the stacking conveyor; and
a preliminary stacking head positioned overtop a first inclined conveyor of the one or more inclined conveyors, the preliminary stacking head being configured to form stacks of slabs on the first inclined conveyor prior to the stacks of slabs being advanced onto the stacking conveyor, the preliminary stacking head forming the stacks of slabs by picking up a first slab as the first slab advances under the preliminary stacking head and then placing the first slab on top of a second slab as the second slab advances under the preliminary stacking head;
wherein the stacking head is configured to remove one or more stacks of slabs from the stacking conveyor and to stack the one or more stacks of slabs on a pallet.

* * * * *